US008683353B2

(12) United States Patent
Buhrke et al.

(10) Patent No.: US 8,683,353 B2
(45) Date of Patent: Mar. 25, 2014

(54) METHOD AND SYSTEM FOR DISTRIBUTED COLLABORATIVE COMMUNICATIONS

(75) Inventors: Eric R Buhrke, Clarendon Hills, IL (US); Carl M. Danielsen, Lake Zurich, IL (US); Renxiang Li, Lake Zurich, IL (US); Magdi A. Mohamed, Schaumburg, IL (US); Mark A. Tarlton, Barrington, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1435 days.

(21) Appl. No.: 11/609,648

(22) Filed: Dec. 12, 2006

(65) Prior Publication Data

US 2008/0141147 A1  Jun. 12, 2008

(51) Int. Cl.
*G06F 3/00* (2006.01)

(52) U.S. Cl.
USPC ............ 715/757; 715/734; 715/738; 715/751

(58) Field of Classification Search
USPC .................................. 715/757, 734, 738, 751
See application file for complete search history.

(56) References Cited

U.S. PATENT DOCUMENTS

| 5,911,045 A | 6/1999 | Leyba et al. |
| 5,999,208 A | 12/1999 | McNerney et al. |
| 6,020,885 A * | 2/2000 | Honda ........................... 715/757 |
| 6,091,410 A | 7/2000 | Lection et al. |
| 6,570,563 B1 * | 5/2003 | Honda ........................... 345/419 |
| 6,798,407 B1 * | 9/2004 | Benman ........................ 345/419 |
| 2002/0188678 A1 | 12/2002 | Edecker et al. |

OTHER PUBLICATIONS

EPC Search Report, RE: Application #07022607.1-2413 May 8, 2008.
Toomey, et al "Meetings in a Virtual Space: Creating a Digital Document" Jan. 6, 1998.
Office Action, Canadian App. No. 2,612,032, Mar. 11, 2010.
EP Rejection for European Patent Application No. 07022607.1, dated Dec. 13, 2011.
EP Rejection for European Patent Application No. 07022607.1, dated Jan. 28, 2009.

\* cited by examiner

*Primary Examiner* — Michael Roswell

(57) ABSTRACT

A method and system for collaborative communications is described. In one embodiment, a central virtual reality communications environment is created. A plurality of client communication devices are connected to the central virtual reality communications environment. Each one of the connected plurality of client communication devices are represented as an avatar present in the central virtual reality communications environment. An uploaded data object is received from any one of the connected plurality of client communication devices. Finally, the data object is displayed in the central virtual reality communications environment to the connected plurality of client communication devices.

20 Claims, 3 Drawing Sheets

METHOD AND SYSTEM FOR DISTRIBUTED COLLABORATIVE COMMUNICATIONS

BACKGROUND OF THE INVENTION

1. Field of the Invention

The present invention relates to communication applications and, more particularly, to a method and system for distributed collaborative communications.

2. Description of the Background Art

Currently, there are many collaborative communications methods. However, most of the current collaborative communications methods have critical drawbacks. For example, users may communicate collaboratively over an audio teleconferencing system. However, each user is not visible and data is not easily exchanged amongst remote participants.

Another collaborative communications method includes video teleconferencing via a television or computer. However, video teleconferencing is not centrally controlled, which makes data exchange inefficient and cumbersome. Moreover, video teleconferencing requires that each participant have similar equipment to participate. Accordingly, there exists a need in the art for a better method and system of collaborative communications.

SUMMARY OF THE INVENTION

A method and system for distributed collaborative communications is described. In one embodiment, a central virtual reality communications environment is created. A plurality of client communication devices are connected to the central virtual reality communications environment. Each one of the connected plurality of client communication devices is represented as an avatar present in the central virtual reality communications environment. A data object is received from any one of the connected plurality of client communication devices. Finally, the data object is displayed in the central virtual reality communications environment to the connected plurality of client communication devices.

BRIEF DESCRIPTION OF DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION OF THE INVENTION

Figure 1:
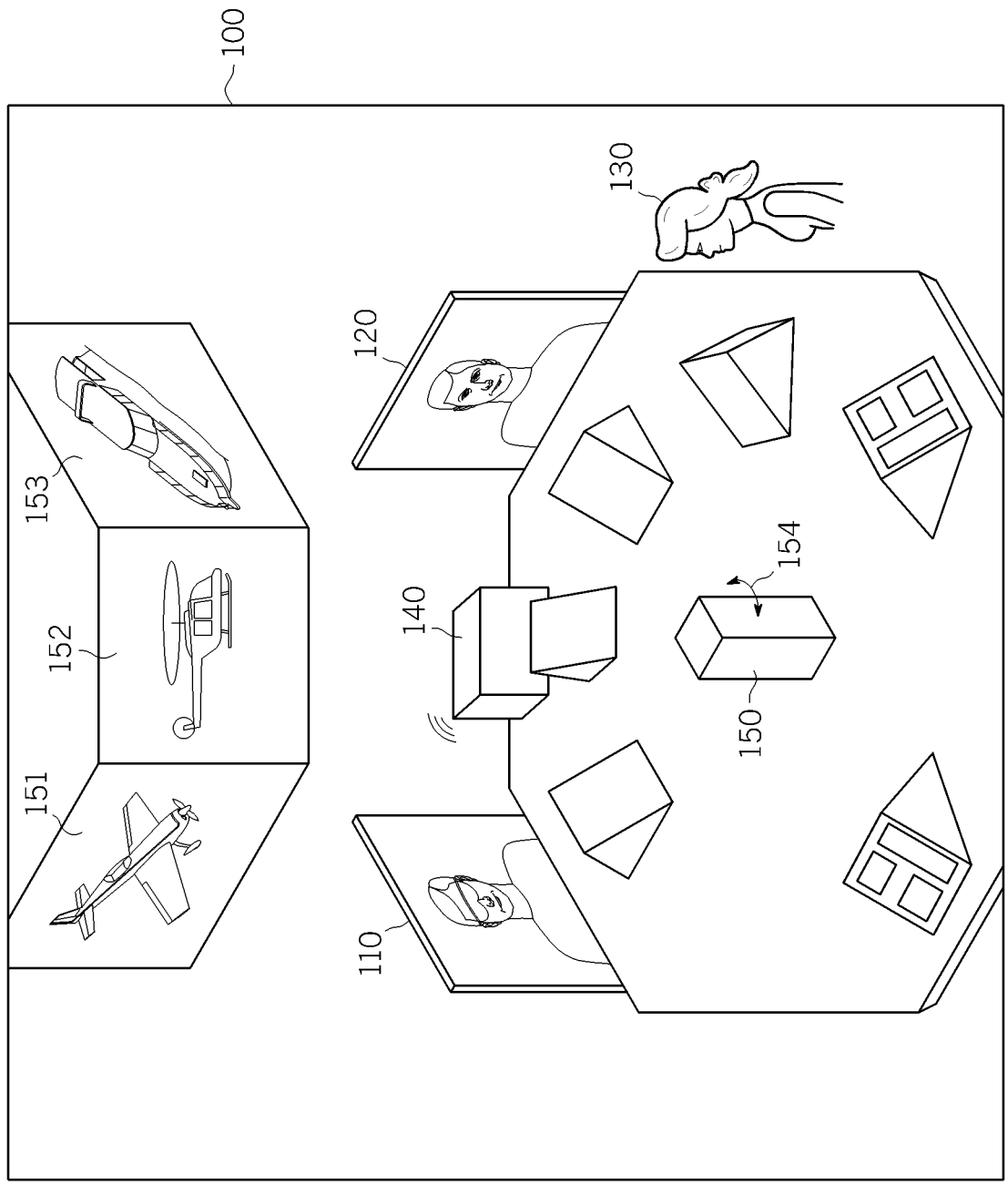
FIG. 1 is an illustration depicting an exemplary embodiment of a central virtual reality communications environment.

FIG. 1 is an illustration depicting an exemplary embodiment of a central virtual reality communications environment 100 in accordance with one or more aspects of the invention. The central virtual reality communications environment 100 may illustrate a room, for example, as illustrated in FIG. 1. However, central virtual reality communications environment 100 may illustrate any environment suitable for distributed collaborative communications.

In one embodiment, the central virtual reality communications environment 100 is a real-time environment. Each user's view in the central virtual reality communications environment 100 is synchronized to every other user. In other words, any action by one user is seen by every other user and affects the other user's view.

Each one of the users is represented in the central virtual reality communications environment 100 as an avatar. Avatars may be video avatars, such as for example avatars 110 and 120, fully animated avatars, such as for example avatar 130 or audio avatars, such as for example avatar 140. Video avatars 110 and 120 may include streaming video of a user at the user's respective client communication device. Client communication devices are described in further detail herein below with reference to FIG. 2. Fully animated avatar 130 may include a full virtual reality graphical image of a user at the user's respective client communication device. Audio avatar 140 may include a symbolic representation with only audio output of a user at the user's respective client communication device. Audio avatar 140 may be, for example, any three dimensional shape ranging from a simple cube or sphere to a more complex three dimensional symbol such as a microphone or other objects. Any number of avatars or combinations of different types of avatars may be present in the virtual reality communications environment 100 at any time, simultaneously.

In an embodiment of the present invention, each one of the avatars is capable of mimicking the actual gestures of the respective users. For example, if a user turns to the right or left to look at an image, the respective avatar will also turn to the left or right in the central virtual reality communications environment 100. More specifically, the avatars will follow the sightline of a respective user located at a respective client communication device.

In another embodiment of the present invention, each one of the avatars is capable of mimicking expressions of the respective users. For example, video avatars 110 and 120 and fully animated avatar 130 may mimic facial expressions of the respective users. For example, video avatars 110 and 120 may mimic facial expressions of the respective users directly by displaying video of the respective user. Fully animated avatar 130 may mimic facial expressions of the respective user by using a virtual reality head/facial tracking device. Audio avatar 140 may mimic vocal expressions by changing colors or patterns according to a pre-determined association of colors to various expressions, the respective user's tone or the way the respective user speaks.

The avatars also present a unique viewpoint or perspective to each of the respective users. For example, video avatar 110 may be able to see a data object on screens 152 and 153, but be unable to see a data object on screen 151, while video avatar 120 may be able to see screens 151 and 152, but be unable to see screen 153. Moreover, if video avatar 110 turns around to see screen 151, video avatar 120 and fully animated avatar 130 will actually see in real time that video avatar 110 has rotated to look at screen 151. While video avatar 110 is rotating, the front of video avatar 110 would disappear in progression from the sightline of fully animated avatar 130 first, and then video avatar 120.

To further illustrate the unique viewpoint or perspective of each of the users, if fully animated avatar 130 grabs a data object 150 in the central virtual reality communications environment 100, the data object will appear to be moving closer to fully animated avatar 130. Simultaneously, the data object 150 will appear to be moving farther away from video avatars 110, 120 and audio avatar 140. Notably, when an avatar has control of a data object, other avatars will not be able to control the same data object simultaneously. For example, if fully animated avatar 130 grabs data object 150 to move it closer to him, video avatar 120 would not be able to simultaneously grab data object 150 to move it closer to her.

The central virtual reality communications environment 100 includes various data objects. Data objects may be various types of multimedia, for example, a live streaming video, MPEG video, photographs, documents or content retrieved from the World Wide Web. The multimedia may be displayed in the central virtual reality communications environment 100 for example, on screens 151, 152 and 153. In an exemplary embodiment, screen 151 may display content retrieved from the World Wide Web, screen 152 may display photographs and screen 153 may display live streaming video. In the central virtual reality communications environment 100, each screen 151, 152 and 153 may support various manipulations, such as for example, pan, zoom and refresh depending on what type of data object is displayed. Although three screens are shown in FIG. 1, those skilled in the art will recognize that the central virtual reality communications environment 100 may include any number of screens.

Data objects may also be created externally by any user. For example, a user may create a model at their respective client communication device before connecting to the central virtual reality communications environment 100 then subsequently, upload the model into the central virtual reality communications environment 100. Data objects that are created externally by any user may also be displayed to all other users by placing them as physical objects or models in the central virtual reality communications environment 100. For example, data object 150 may be created externally by a user represented by video avatar 110. The data object 150 may be, for example, a three dimensional model of an object, such as for example a building that may be rotated in a manner as shown by arrow 154. Although the present example shows a three dimensional model of an object, it is within the scope of the present invention for the data object to be any physical object including documents, videos, still images, schematic diagrams, an audio file and the like.

Once data object 150 is placed in the central virtual reality communications environment 100, any user may request to manipulate data object 150 via the respective avatars. For example, because each user has a unique viewpoint or perspective, video avatar 110 may not be able to see the backside of data object 150. Therefore, to get a better view, the user may request to rotate data object 150 via video avatar 110 to view the backside of data object 150. Other manipulations of physical data objects, such as data object 150, placed in central virtual reality communications environment 100 may be for example, but not limited to, picking up the object, moving the object, rotating the object and deleting the object from the central virtual reality communications environment 100.

Notably, the data objects described above are all in the central virtual reality communications environment 100. They are all displayed as part of the central virtual reality communications environment 100 such that any user may manipulate the data objects, even if the data objects are created externally by any user at a respective client communication device. In one embodiment, the data objects are not owned by any particular user. For example, if data object 150 is externally created and uploaded by video avatar 110 and video avatar 110 leaves the central virtual reality communications environment 100, the data object 150 would still remain in the central virtual reality communications environment 100 for viewing and manipulation by other avatars, or even new avatars that enter the central virtual reality communications environment 100.

In other embodiments of the present invention, the central virtual reality communications environment 100 may be completely configurable. For example, the aesthetics of the central virtual reality communications environment may be customized to the liking of any user. Customizable options may be for example, but not limited to, changing the number of screens in the central virtual reality communications environment 100, the color scheme of the central virtual reality communications environment 100 and what data objects, including externally created data objects, can be placed in the central virtual reality communications environment 100.

In further embodiments of the present invention, the central virtual reality communications environment 100 may include multiple rooms. Each room may represent a different team of a collaborative project or a disaster response team. A user, via the user's respective avatar, may enter and leave any one of the rooms of the central virtual reality communications environment 100. Each room would include the characteristics of the central virtual reality communications environment 100, as discussed above. However, each room may define its own set of unique characteristics or requirements, for example, video avatars only, audio capability only and so on, customized for each user.

Consequently, a high level of information exchange can occur between multiple users using the present central virtual reality communications environment 100. For example, situations can be assessed quickly and decisions can be made soon thereafter, e.g. during a crisis situation where a plurality of users, e.g. a police department, a fire department, a hospital, a mayoral office and the like, can quickly join a communication session in the central virtual reality communications environment 100, irrespective of each user's communication capabilities. The invention advantageously allows users at remote, as well as local, locations to gather in the virtual reality communications environment 100 and analyze and manipulate any data object e.g., a live video clip of a disaster or a data object created and uploaded by any user. Thus, an improved and more efficient distributed collaborative communication is achieved that can be applicable to for example, but not limited to, public safety and emergency response applications.

Figure 2:
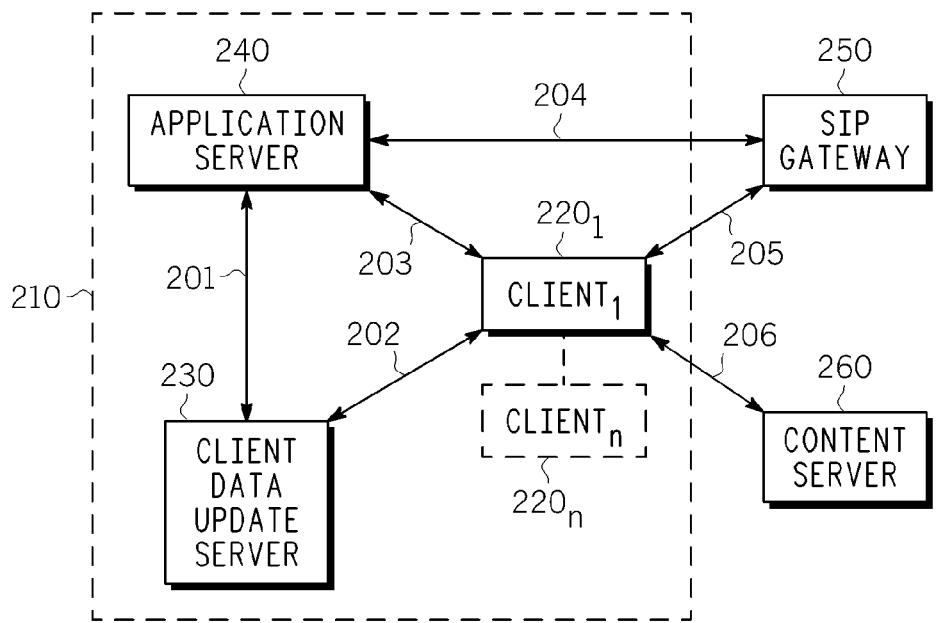
FIG. 2 is a block diagram depicting an exemplary embodiment of system components for implementing the present invention.

FIG. 2 is a high level system block diagram depicting an exemplary embodiment of a system 200 having a plurality of system components for implementing the present invention. System 200 includes client communication devices $220_1$ to $220_n$ (hereinafter referred to collectively also as client communication devices 220), client data update server 230, application server 240, Session Initiation Protocol (SIP) gateway 250 and content server 260. At a minimum, system 200 includes the components inside dashed line 210, i.e. client communication devices 220, client data update server 230 and application server 240. Although FIG. 2 depicts only one client data update server 230, application server 240, SIP gateway 250 and content server 260, those skilled in the art will recognize that system 200 may include a plurality of client data update servers, application servers, SIP gateways and/or content servers. In an exemplary embodiment of the present invention, there is a plurality of client communication devices $220_1$ to $220_n$ in system 200.

In one embodiment, client communication devices 220 may comprise a land line telephone, a mobile phone, a personal digital assistant (PDA), a laptop computer, a desktop computer, an IP phone, a netcam/webcam, a full virtual reality suit and the like. Client communication devices 220 communicate with client data update server 230 via communication link 202 and application server 240 via communication link 203. Client data update server 230 may also communicate with application server 240 via communication link 201. All the communication links 201-206 may be, for example, an internet protocol (IP), Ethernet or wireless connection.

In one embodiment, client data update server 230 may be for example, a streaming media server. One responsibility of client data update server 230 is to distribute the data objects to client communication devices 220 and to ensure that data objects distributed are synchronized with respect to each one of the client communication devices 220. The client data update server 230 implements synchronization by any acceptable method of synchronization. One method of synchronization is by having client data update server 230 "throttle" (i.e. select the proper resolution and/or size of the data object to be displayed) the data objects to the client communication devices 220. For example if client communication device $220_1$ is on a high bandwidth connection and client communication device $220_n$ is on a low bandwidth connection, client data update server 230 will keep both client communication devices synchronized with respect to the data object being viewed by proper "throttling", i.e. lower resolution and/or size of the data object will be sent to client communication device $220_1$ on a low bandwidth connection and higher resolution and/or size of the data object will be sent to the client communication device $220_n$ on a high bandwidth connection.

Another exemplary method of keeping the data objects distributed to client communication devices 220 synchronized is a timing method. For example, in one embodiment, the client data update server 230 implements synchronization of the data objects being viewed by implementing a timing model that keeps an individual data clock of each client communication device and the data object time aligned.

Moreover, client data update server 230 serves to encode the data objects. For example, client communication device $220_1$ may be a small hand held device with a very small screen and client communication device $220_n$ may be a large plasma television screen. Prior to transmitting the data object to client communication device $220_1$ and client communication device $220_n$, the client data update server 230 will recognize the proper format of the data object that will be required to be displayed by the small screen of client communication device $220_1$ or the large plasma television screen of client communication device $220_n$. In other words, the data objects are encoded with the proper size and resolution before being sent to the client communication devices 220, rather than sending the data objects to the client communication devices 220 and requiring transcoding of the data objects by the client communication devices 220.

In one embodiment, client data update server 230 also provides client communication device management. Client data update server 230 detects new client communication devices 220 that join or client communication devices 220 that exit the central virtual reality communications environment 100. Client data update server 230 then notifies application server 240 of their existence for state management by the application server 240, as discussed below.

Regarding application server 240, one exemplary responsibility of the application server 240 is to manage a state (i.e. active or inactive) of the client communication devices 220 connected to the central virtual reality communications environment 100. Application server 240 uses a distributed database architecture to help manage the state of the client communication devices 220 connected to the central virtual reality communications environment 100. The distributed database architecture comprises a local database in each one of the client communication devices 220. Moreover, each local database contains a copy of a scene tree of the central virtual reality communications environment 100 stored in a main database located at application server 240.

The application server 240 manages the state of the client communication devices 220 connected to the central virtual reality communications environment 100 by synchronizing the scene trees on each of the distributed local databases of client communication devices 220. For example, if client communication device $220_1$ is disconnected from the central virtual reality communications environment 100 (i.e. inactive) and tries to re-connect to the central virtual reality communications environment 100 (i.e. become active), application server 240 may bring client communication device $220_1$ to a current state of the central virtual reality communications environment 100 by updating the local database at client communication device $220_1$ rather than re-building the entire scene tree at the main database located at application server 240. Thereby, a peer-to-peer synchronization is achieved.

Application server 240 also arbitrates client communication device requests to manipulate data objects in the central virtual reality communications environment 100. As discussed above, a data object may not be manipulated by two avatars simultaneously. Referring to FIG. 1, if video avatar 110 and fully animated avatar 130 requests to manipulate data object 150 simultaneously, a conflict arises. Application server 240 resolves the conflict by arbitrating which request to grant.

Finally, application server 240 also manages the configurability of the central virtual reality communications environment 100. When any one of the client communication devices 220 requests to change an element of the central virtual reality communications environment 100, the changes are maintained and updated in the main database. In addition, when any data objects created by any of the users from client communication devices 220 is requested to be placed in the central virtual reality communications environment 100, the requests are received by the application server 240, uploaded to the main database and then propagated out to the other client communication devices 220 through communication link 203.

In one embodiment, system 200 may also include SIP gateway 250 and content server 260. Client communication devices 220 may be connected to SIP gateway 250 via communication link 205. SIP gateway 250 allows connections to be made by client communication devices 220 using SIP to the central virtual reality communications environment 100. SIP gateway 250 may be connected to application server 240 via communication link 204.

Client communication devices 220 may be connected to content server 260 via communication link 206. In an exemplary embodiment, content server 260 allows content to be retrieved directly in to the central virtual reality communications environment 100. The content can be locally stored, or if the content is not available, it can be obtained via a public network, e.g. the World Wide Web (WWW) or a Virtual Private Network (VPN).

Each user uses a respective client communication device $220_1$ to $220_n$ to enter the central virtual reality communications environment 100. Client communication devices 220 may be located either locally or remotely. Each user's unique viewpoint or perspective is displayed by respective client communication devices $220_1$ to $220_n$. For example, a first user using client communication device $220_1$ to enter the central virtual reality communications environment 100 will not see his respective avatar. The first user using client communication device $220_1$ will only see a unique viewpoint or perspective as if the first user is actually in the central virtual reality communications environment 100. Moreover, as the first user looks around at various data objects in the central virtual reality communications environment 100, other users' viewpoint or perspective, via their respective client communication device $220_1$ to $220_n$, will display the first user's avatar as looking at the various data objects in the central virtual reality communications environment 100. The first user may interact in the central virtual reality communications environment 100 via his respective avatar by using a device at the first user's client communication device $220_1$ such as, for example a mouse, a keyboard, a pointing device, a track ball or a virtual reality head/facial/body tracking device.

In addition, each one of the client communication devices 220 may be heterogeneous. For example, one client communication device may only have audio capabilities. Another client communication device may have audio and video capabilities. Yet another client communication device may have full virtual reality capabilities with full body tracking.

As discussed above referring to FIG. 1, data objects may be displayed by placing them as physical objects or models in the central virtual reality communications environment 100 that are created externally by any user. Each one of the client communication devices 220 may be used to upload data objects to the system to be incorporated into the central virtual reality communications environment 100. Moreover, each one of the client communication devices 220 is capable of downloading all elements of the central virtual reality communications environment 100 to a local database for customization.

Figure 3:
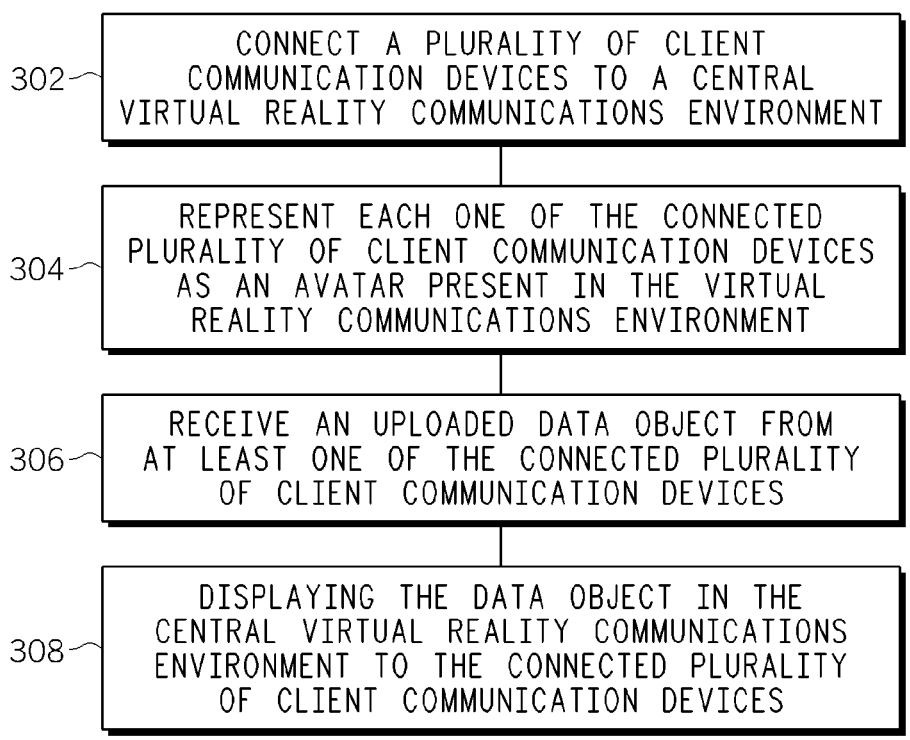
FIG. 3 is a flow diagram depicting an exemplary embodiment of a method of collaborative communications in accordance with one or more aspects of the invention.

FIG. 3 is a flow diagram depicting an exemplary embodiment of a method 300 of collaborative communications. The method 300 begins at step 302, where after receiving a request from a plurality of client communication devices $220_1$ to $220_n$ to connect to a central virtual reality communications environment 100, the plurality of client communication devices $220_1$ to $220_n$ are connected to the central virtual reality communications environment 100. The central virtual reality communications environment 100 may be created and stored, for example, as scene trees stored at the main database located at application server 240. As discussed above, using a distributed database architecture, a local copy of the scene tree may be kept on each one of the client communication devices 220 in a local database. It should be noted that the central virtual reality communications environment 100 is capable of supporting at minimum, voice communications between the client communication devices 220.

At step 304, after being connected to the central virtual reality communications environment 100, each one of the connected plurality of client communication devices $220_1$ to $220_n$ are represented as an avatar present in the central virtual reality communications environment 100. The type of avatar (i.e. video, fully animated or audio) representing each one of the connected plurality of client communication devices $220_1$ to $220_n$ depends on what type of client communication device is used (i.e. audio only, audio and video or full virtual reality capabilities with full body tracking).

At step 306, an uploaded data object created externally by at least one of the connected plurality of client communication devices $220_1$ to $220_n$, as discussed above, may be received.

At step 308, the data object is displayed in the central virtual reality communications environment 100 to the connected plurality of client communication devices $220_1$ to $220_n$. Once the data object is displayed in the central virtual reality communications environment 100, each one of the connected plurality of client communication devices $220_1$ to $220_n$ may request to manipulate the data object. Simultaneous requests to manipulate the data object are resolved by the application server 240, as described above.

Figure 4:
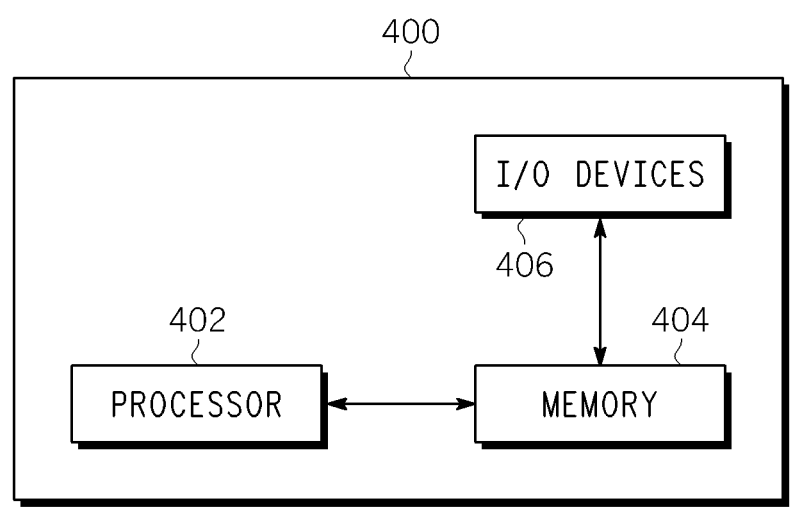
FIG. 4 is a block diagram depicting a computer suitable for implementing the processes and methods described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM) and/or persistent memory (Flash) and various input/output devices 406 (e.g., storage devices, including but not limited to, a tape drive, a floppy drive, a hard disk drive, a compact disk drive, a receiver, a transmitter, a speaker, a display, a speech synthesizer, an output port, and a user input device (such as a keyboard, a keypad, a mouse, etc.) and the like.

It should be noted that the present invention can be implemented in software and/or in a combination of software and hardware, e.g., using application specific integrated circuits (ASIC), a general purpose computer or any other hardware equivalents. In one embodiment, program instructions for executing the functionality of any of the components of system 200 can be loaded into memory 404 and executed by processor 402 to implement the functions as discussed above. As such, the program instructions for executing the functionality of any of the components of system 200 can be stored on a computer readable medium or carrier, e.g., RAM memory, magnetic or optical drive or diskette and the like.

While the foregoing is directed to illustrative embodiments of the present invention, other and further embodiments of the invention may be devised without departing from the basic scope thereof, and the scope thereof is determined by the claims that follow.

What is claimed is:

1. A method of distributed collaborative communications, comprising:
    connecting a plurality of client communication devices to a central virtual reality communications environment;
    representing each one of the connected plurality of client communication devices as an avatar present in the central virtual reality communications environment;
    in a central unit, maintaining a scene tree including data objects and avatars;
    distributing a copy of the scene tree to the client communication devices;
    receiving, from a participating client communication device of the connected plurality of client communication devices, an uploaded data object created by the participating client communication device, and placing the uploaded data object in the scene tree;
    distributing the uploaded data object to each one of the connected plurality of client communication devices, wherein the uploaded data object is synchronized with respect to each one of the connected client communication devices; and
    displaying the uploaded data object in the central virtual reality communications environment to be manipulable by any of the connected plurality of client communication devices.

2. The method of claim 1, wherein the virtual reality communications environment is a virtual reality room.

3. The method of claim 1, further comprising:
allowing each one of said plurality of client communication devices to customize the central virtual reality communications environment.

4. The method of claim 1, wherein the avatar comprises at least one of: a fully animated avatar, a video avatar or an audio avatar.

5. The method of claim 1, further comprising:
replicating expressions of a respective user of the connected plurality of client communication devices via a respective avatar.

6. The method of claim 1, further comprising:
receiving a request to manipulate the data object in the central virtual reality communications environment from at least one of the connected plurality of client communication devices;
manipulating the data object in the central virtual reality communications environment under control of a single client communication device in response to the request; and
presenting the manipulated object to the connected plurality of client communication devices in accordance with each client communication device's perspective.

7. The method of claim 1, further comprising:
creating a unique perspective for each one of the connected plurality of client communication devices with respect to the displayed data object in the central virtual reality communications environment.

8. A system for distributed collaborative communications comprising:
means for connecting a plurality of client communication devices to a central virtual reality communications environment;
means for representing each one of the connected plurality of client communication devices as an avatar present in the central virtual reality communications environment;
means for maintaining a scene tree including data objects and avatars;
means for distributing a copy of the scene tree to the client communication devices;
means for receiving, from a participating client communication device of the connected plurality of client communication devices, an uploaded data object created by the participating client communication device, and placing the uploaded data object in the scene tree;
means for distributing the uploaded data object to each one of the connected plurality of client communication devices, wherein the uploaded data object is synchronized with respect to each one of the connected client communication devices; and
means for displaying the uploaded data object in the central virtual reality communications environment to be manipulable by any of the connected plurality of client communication devices.

9. The system of claim 8, wherein the virtual reality communications environment is a virtual reality room.

10. The system of claim 8, further comprising:
means for allowing each one of said plurality of client communication devices to customize the central virtual reality communications environment.

11. The system of claim 8, wherein the avatar comprises at least one of: a fully animated avatar, a video avatar or an audio avatar.

12. The system of claim 8, further comprising:
means for replicating expressions of a respective user of the connected plurality of client communication devices via a respective avatar.

13. The system of claim 8, further comprising:
means for receiving a request to manipulate the data object in the central virtual reality communications environment from at least one of the connected plurality of client communication devices;
means for manipulating the data object in the central virtual reality communications environment under control of a single client communication device in response to the request; and
means for presenting the manipulated object to the connected plurality of client communication devices in accordance with each client communication device's perspective.

14. The system of claim 8, further comprising:
means for creating a unique perspective for each one of the connected plurality of client communication devices with respect to the displayed data object in the central virtual reality communications environment.

15. A non-transitory computer readable medium having stored thereon instructions that when executed by a processor cause the processor to perform a method of distributed collaborative communications comprising:
connecting a plurality of client communication devices to a central virtual reality communications environment;
representing each one of the connected plurality of client communication devices as an avatar present in the central virtual reality communications environment;
in a central unit, maintaining a scene tree including data objects and avatars;
distributing a copy of the scene tree to the client communication devices;
receiving, from a participating client communication device of the connected plurality of client communication devices, an uploaded data object created by the participating client communication device, and placing the uploaded data object in the scene tree;
distributing the uploaded data object to each one of the connected plurality of client communication devices, wherein the uploaded data object is synchronized with respect to each one of the connected client communication devices; and
displaying the uploaded data object in the central virtual reality communications environment to be manipulable by any of the connected plurality of client communication devices.

16. The computer readable medium of claim 15, further comprising:
allowing each one of said plurality of client communication devices to customize the central virtual reality communications environment.

17. The computer readable medium of claim 15, wherein the avatar comprises at least one of: a fully animated avatar, a video avatar or an audio avatar.

18. The computer readable medium of claim 15, further comprising:
replicating expressions of a respective user of the connected plurality of client communication devices via a respective avatar.

19. The computer readable medium of claim 15, further comprising:
receiving a request to manipulate the data object in the central virtual reality communications environment from at least one of the connected plurality of client communication devices;

manipulating the data object in the central virtual reality communications environment under control of a single client communication device in response to the request; and presenting the manipulated object to the connected plurality of client communication devices in accordance with each client communication device's perspective.

20. The computer readable medium of claim 15, further comprising:

creating a unique perspective for each one of the connected plurality of client communication devices with respect to the displayed data object in the central virtual reality communications environment.

\* \* \* \* \*